(12) United States Patent
Song et al.

(10) Patent No.: US 10,673,355 B2
(45) Date of Patent: Jun. 2, 2020

(54) NANO-GENERATOR

(71) Applicant: AGENCY FOR DEFENSE DEVELOPMENT, Daejeon (KR)

(72) Inventors: Insang Song, Daejeon (KR); Dongsung Kim, Gyeongsangbuk-do (KR); Donghyeon Yoo, Gyeongsangbuk-do (KR); Dongwhi Choi, Gyeongsangbuk-do (KR)

(73) Assignee: AGENCY FOR DEFENSE DEVELOPMENT (KR)

( * ) Notice: Subject to any disclaimer, the term of this patent is extended or adjusted under 35 U.S.C. 154(b) by 149 days.

(21) Appl. No.: 15/826,883

(22) Filed: Nov. 30, 2017

(65) Prior Publication Data

US 2018/0323727 A1 Nov. 8, 2018

(30) Foreign Application Priority Data

May 4, 2017 (KR) .......................... 10-2017-0057002

(51) Int. Cl.
*H02N 1/04* (2006.01)

(52) U.S. Cl.
CPC ..................... *H02N 1/04* (2013.01)

(58) Field of Classification Search
CPC ........................................................ H02N 1/04
See application file for complete search history.

(56) References Cited

U.S. PATENT DOCUMENTS

| 8,536,760 B1* | 9/2013 | Kim ..................... H02N 11/002 310/309 |
| 8,841,816 B2* | 9/2014 | Masaki .................... H02N 1/08 310/300 |
| 2015/0061460 A1* | 3/2015 | Bae .......................... H02N 1/04 310/310 |
| 2015/0061464 A1* | 3/2015 | Park ....................... H01L 41/113 310/329 |
| 2016/0149517 A1* | 5/2016 | Choi ........................ H02N 1/04 310/310 |

OTHER PUBLICATIONS

Office Action dated Apr. 12, 2018 in corresponding Korean Patent Application No. 10-2017-0057002.
(Continued)

*Primary Examiner* — Quyen P Leung
*Assistant Examiner* — Minki Chang
(74) *Attorney, Agent, or Firm* — Ostrolenk Faber LLP

(57) ABSTRACT

A nano-generator includes a counterpart layer, and an electricity producing unit producing frictional electricity according to frictional contact with the counterpart layer, wherein the electricity producing unit includes a contact layer provided on one surface of the electricity producing unit and coming into contact with the counterpart layer, a support layer provided on the other surface of the electricity producing unit, and a plurality of first electrode layers stacked between the contact layer and the support layer and disposed to be spaced apart from each other. Since the contact electrification nano-generator harvests energy (current), regardless of direction (mode) of a mechanical movement, an energy output of the contact electrification nano-generator may be increased.

14 Claims, 5 Drawing Sheets

(56) References Cited

OTHER PUBLICATIONS

Donghyeon Yoo, et al., "Comb-Shaped Electrode-Based Triboelectric Nanogenerators for Bi-Directional Mechanical Energy Harvesting," Microelectronic Engineering, 174 (2017) pp. 46-51 (Jan. 7, 2017.).

Xiao-Sheng Zhang, et al., "Frequency-Multiplication High-Output Triboelectric Nanogenerator for Sustainably Powering Biomedical Microsystems," ACS Publications, Nano Letters, 13 (2013), pp. 1168-1172 (Feb. 5, 2013.).

Office Action dated Dec. 5, 2018 in corresponding Korean Patent Application No. 10-2017-0057002.

Hengyu Guo, et al., "A Triboelectric Generator Based on Checker-Like Interdigital Electrodes with a Sandwiched PET Thin Film for Harvesting Sliding Energy in All Directions," Advanced Energy Materials, 5 (2015), pp. 1-9 (first published Aug. 4. 2014.).

\* cited by examiner

NANO-GENERATOR

CROSS-REFERENCE TO RELATED APPLICATION

Pursuant to 35 U.S.C. § 119(a), this application claims the benefit of earlier filing date and right of priority to Korean Application No. 10-2017-0057002, filed on May 4, 2017, the contents of which is incorporated by reference herein in its entirety.

BACKGROUND OF THE INVENTION

1. Field of the Invention

The present disclosure relates to a nano-generator collecting frictional electricity discarded in our daily lives to recycle it as electric power.

2. Background of the Invention

Recently, a contact electrification nano-generation technology, an energy harvesting technology, attracting people's attention worldwide, produces electric energy using frictional electricity produced when two different materials come into contact with each other and induced charge entailed by the frictional electricity.

Compared with other conventional energy harvesting technologies, the contact electrification nano-generation technology has advantages of usefulness and excellent accessibility and, as such, the contact electrification nano-generation technology has come to prominence as a system that meets the needs of the times to develop a sustainable energy source. Also, the contact electrification nano-generation technology produces electric energy even over a fine mechanical movement, so application thereof to various sensors, as well as to the energy harvesting technology, has recently been reported.

Meanwhile, a mechanical movement as a power source of the contact electrification nano-generation technology is classified into a horizontal component and a vertical component, and in an existing method for increasing energy, driving modes are divided according to directions of mechanical movements.

However, in real life, mechanical movements are present in a state in which components of respective directions coexist, and thus, an existing research scheme concentrating on a mechanical movement in any one direction, i.e., any one driving mode, has shortcomings in that it reflects only a limited mechanical movement, which acts as a factor hampering enhancement of energy harvesting efficiency.

SUMMARY OF THE INVENTION

Therefore, an aspect of the detailed description is to provide a nano-generator capable of producing energy, regardless of direction of a mechanical movement.

To achieve these and other advantages and in accordance with the purpose of this specification, as embodied and broadly described herein, a nano-generator includes: a counterpart layer; and an electricity producing unit producing frictional electricity according to frictional contact with the counterpart layer, wherein the electricity producing unit includes: a contact layer provided on one surface of the electricity producing unit and coming into contact with the counterpart layer; a support layer provided on the other surface of the electricity producing unit; and a plurality of first electrode layers stacked between the contact layer and the support layer and disposed to be spaced apart from each other.

The plurality of first electrode layers may overlap the support layer in a thickness direction to partially cover upper portions of the support layer.

The plurality of first electrode layers may have conductive properties.

The plurality of first electrode layers may be disposed to be spaced apart from each other in a transverse direction and longitudinal direction on a horizontal plane.

The nano-generator may further include: a plurality of conductive parts extending in a transverse direction or a longitudinal direction between two adjacent first electrode layers among the plurality of first electrode layers to electrically connect the two first electrode layers.

The plurality of first electrode layers may each extend in a longitudinal direction and may be disposed to be spaced apart from each other in a transverse direction on a horizontal plane.

The nano-generator may further include: a conductive part extending in a transverse direction perpendicular to the plurality of first electrode layers to electrically connect the plurality of first electrode layers.

A plurality of fine protrusions in a micro- or nano-scale may be provided on on an upper surface of the contact layer.

A plurality of fine protrusions in a micro- or nano-scale may be provided on a lower surface of the counterpart layer.

The contact layer and the counterpart layer may be formed of materials having different electrostatic characteristics and may be different in order of frictional electrification (or triboelectrification).

The contact layer and the counterpart layer may be separated from each other when an external force is not applied to a surface of a portion of at least one of the contact layer and the counterpart layer, and may come into contact with each other when an external force is applied thereto.

The contact layer and the counterpart layer may come into contact with each other when an external force is not applied to a surface of a portion of at least one of the contact layer and the counterpart layer, and may be separated from each other when an external force is applied thereto.

To achieve these and other advantages and in accordance with the purpose of this specification, as embodied and broadly described herein, a nano-generator includes: a counterpart layer; and an electricity producing unit producing frictional electricity according to frictional contact with the counterpart layer, wherein the electricity producing unit includes: a contact layer provided on one surface of the electricity producing unit and coming into contact with the counterpart layer; a support layer provided on the other surface of the electricity producing unit; and a plurality of first electrode layers stacked between the contact layer and the support layer and disposed to be spaced apart from each other, and further includes: a plurality of second electrode layers stacked on the counterpart layer and disposed to be spaced apart from each other.

The plurality of first electrode layers and the plurality of second electrode layers may overlap in a thickness direction.

The plurality of second electrode layers may overlap the counterpart layer in a thickness direction to partially cover upper portions of the counterpart layer, and may be electrically connected to each other The plurality of second electrode layers may have conductive properties.

The present disclosure configured as described above have the following advantages.

Since the contact electrification nano-generator capable of harvesting energy (current), regardless of direction (mode) of a mechanical movement, by changing a shape of an electrode of the nano-generator, an energy output of the contact electrification nano-generator may be increased.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Hereinafter, a nano-generator related to the present disclosure will be described in detail with reference to the accompanying drawings. As used herein, the singular forms "a", "an" and "the" are intended to include the plural forms as well, unless the context clearly indicates otherwise.

In describing the present invention, if a detailed explanation for a related known function or construction is considered to unnecessarily divert the gist of the present invention, such explanation has been omitted but would be understood by those skilled in the art.

The present disclosure relates to a multi-mode nano-generator. Multi-mode refers to a concept including both a horizontal driving mode and a vertical driving mode when driving modes are classified according to directions of a mechanical movement.

Figure 1:
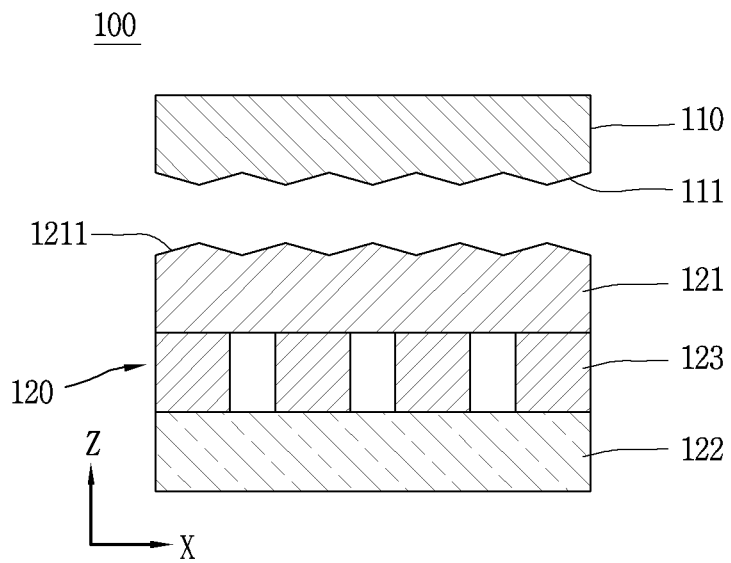
FIG. 1 is a conceptual view illustrating a structure of a nano-generator according to a first embodiment of the present disclosure.
Figure 2:
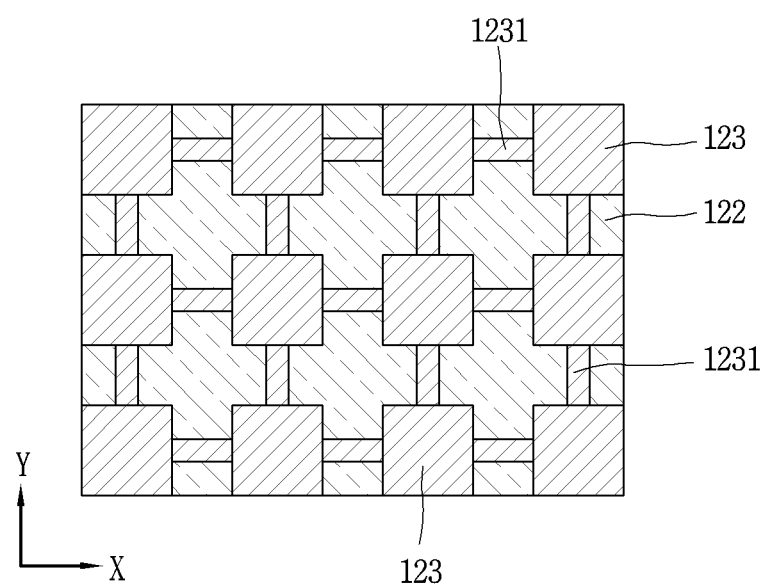
FIG. 2 is a plan view illustrating an electrode layer stacked on a support layer of FIG. 1.

FIG. 1 is a conceptual view illustrating a structure of a nano-generator 100 according to a first embodiment of the present disclosure, and FIG. 2 is a plan view illustrating an electrode layer stacked on a support layer 122 of FIG. 1.

The multi-mode nano-generator 100 includes a counterpart layer 110 and an electricity producing unit 120.

The counterpart layer 110 is a contact target for generating friction with the electricity producing unit 120. At least a portion of the counterpart layer 110 may come into frictional contact with the electricity producing unit 120. Micro or nano-scale fine protrusions 111 are provided on a lower surface of the counterpart layer 110 to allow the counterpart layer 110 may effectively come into frictional contact with the electricity producing unit 120. The counterpart layer 110 may be a moving side. The counterpart layer 110 may be moved in an up-down direction (or a vertical direction) or in a forward/backward/leftward/rightward direction (or a horizontal direction) according to an action of an external force. For example, the counterpart layer 110 may be moved toward the electricity producing unit 120 by an external force so as to come into contact with a portion of the electricity producing unit 120 or be separated therefrom.

The electricity producing unit 120 may include a contact layer 121, a support layer 122, and a first electrode layer 123.

The electricity producing unit 120 may produce electric energy through frictional contact with the counterpart layer 110.

The electricity producing unit 120 may be a fixed side. The counterpart layer 110 and the electricity producing unit 120 may be defined as a moving side and a fixed side according to user definitions, but the moving side and the fixed side may be interchanged or both may be moving sides. Here, in case where both the counterpart layer 110 and the electricity producing unit 120 are moving sides, the counterpart layer 110 and the electricity producing unit 120 may come into frictional contact with each other by mutually relative movements.

The contact layer 121 forms one surface of the electricity producing unit 120. The contact layer 121 may face the counterpart layer 110 and come into contact with the counterpart layer 110. In detail, the contact layer 121 may be disposed to face the fine protrusions 111 of the counterpart layer 110 and may come into contact with at least a portion of the counterpart layer 110 or may be separated therefrom. The contact layer 121 and the counterpart layer 110 may repeatedly come into contact with each other and be separated from each other.

At least a portion of the contact layer 121 may come into frictional contact with the counterpart layer 110. Nano-scale fine protrusions 1211 are provided on an upper surface of the contact layer 121 so as to effectively come into frictional contact with the counterpart layer 110.

The counterpart layer 110 and the contact layer 121 may be formed of materials having different electrostatic characteristics, so that there is a difference in a degree of frictional electrification (or triboelectrification). For example, the counterpart layer 110 may be electrified with positive charges, and the contact layer 121 may be electrified with negative charges.

The contact layer 121 may be formed of a fluorinated polymer having qualities of easily obtaining electrons in the order of frictional electrification.

The support layer 122 forms another surface of the electricity producing unit 120. The support layer 122 may be disposed in a direction opposite to a direction of the contact layer 121. The support layer 122 may support the electrode layer. The support layer 122 may protect the electrode layer.

An induced current may flow in the first electrode layer 123 due to frictional electricity. The first electrode layer 123 may be disposed in plurality on the support layer 122 to partially cover an upper surface of the support layer 122. The plurality of first electrode layers 123 may be disposed to be spaced apart from each other on the same horizontal plane in a transverse direction (X) or in a longitudinal direction (Y). The plurality of first electrode layers 123 may be disposed at a uniform interval between the contact layer 121 and the support layer 122. The plurality of first electrode layers 123 have conductive properties. The plurality of first electrode layers 123 may be connected to a power supply unit to receive power. The plurality of first electrode layers 123 may be formed of a film having conductivity.

A plurality of conductive parts 1231 may be provided between the plurality of first electrode layers 123 and electrically connect the plurality of first electrode layers 123. For example, the conductive part 1231 may extend in the horizontal direction (X) between two adjacent first electrode layers, among the plurality of first electrode layers 123 disposed in a row at a predetermined interval in the horizontal direction (X), to connect the two first electrode layers 123. Also, the conductive part 1231 may extend in the horizontal direction (X) between two adjacent first electrode layers, among the plurality of first electrode layers 123 disposed in a row at a predetermined interval in the vertical direction (Y), to connect the two first electrode layers 123. Here, since the plurality of first electrode layers 123 are electrically connected by the plurality of conductive parts 1231, although even only any one of the plurality of first electrode layers 123 is connected to the power supply unit by a single electric wire, an effect of applying power to all of the plurality of first electrode layers 123 may be obtained. If the plurality of first electrode layers 123 are independently disposed to be spaced apart from each other without the conductive parts 1231, the respective electrode layers 123 may need to be separately connected to an electric wire, complicating connection of the electric wires and increasing cost.

Hereinafter, a driving principle of the nano-generator 100 according to the present disclosure will be described.

Figure 3:
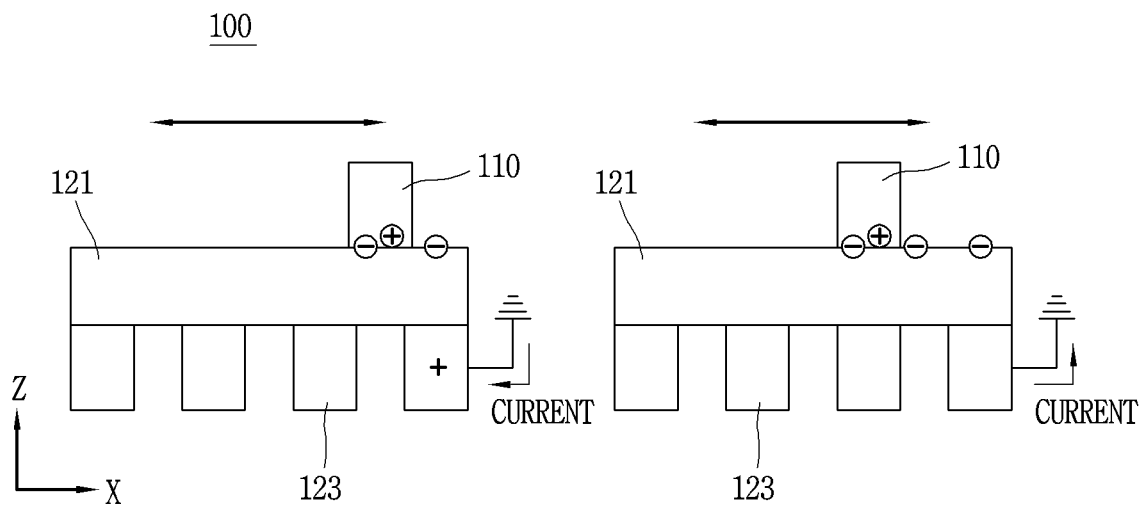
FIG. 3 is a conceptual view illustrating a driving principle of a contact-electrification nano-generator in a horizontal driving mode according to the present disclosure.
Figure 4:
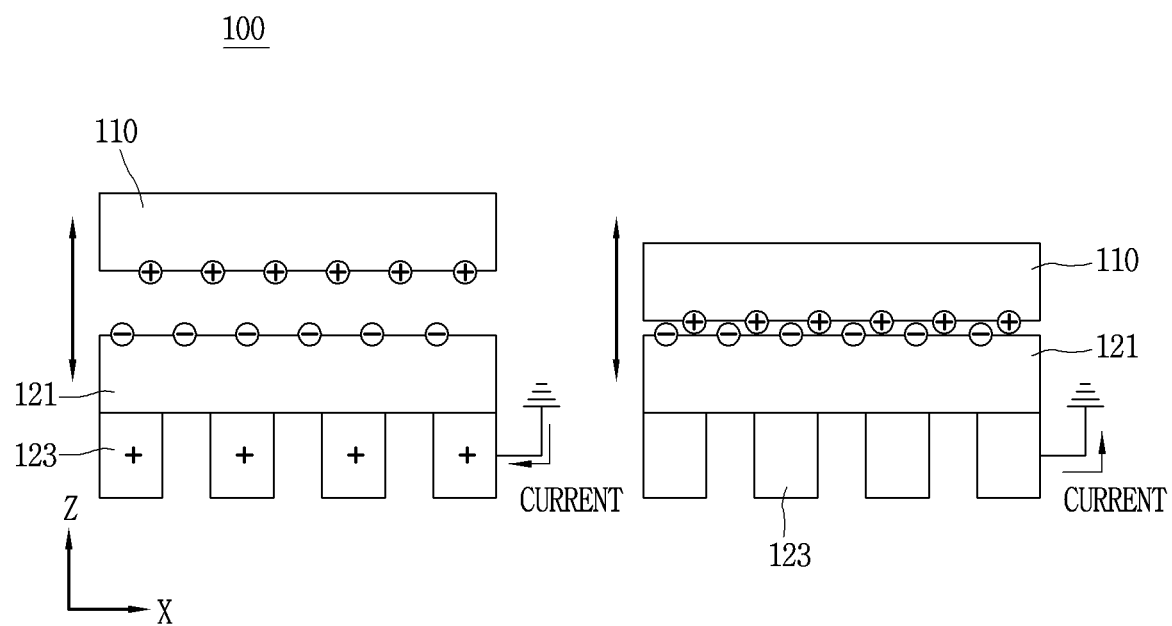
FIG. 4 is a conceptual view illustrating a driving principle of a contact-electrification nano-generator in a vertical driving mode according to the present disclosure.

FIG. 3 is a conceptual view illustrating a driving principle of the contact-electrification nano-generator 100 in a horizontal driving mode according to the present disclosure, and FIG. 4 is a conceptual view illustrating a driving principle of the contact-electrification nano-generator 100 in a vertical driving mode according to the present disclosure.

Referring to FIG. 3, in the horizontal driving mode in which a mechanical movement is made in a horizontal direction, at least a portion of the counterpart layer 110 may move in the horizontal direction in a state of being in contact with the contact layer 121. Here, since friction occurs due to contact between the counterpart layer 110 and the contact layer 121, the counterpart layer 110 is electrified with positive charges and the contact layer 121 is electrified with negative charges.

Here, when a portion of the counterpart layer 110 is disposed to stagger with respect to any one of the plurality of first electrode layers 123 in a thickness direction (not to overlap) (please refer to the left drawing), negative charges of the contact layer 121 are exposed and positive charges are induced to the first electrode layer 123 to form an electrostatic equilibrium. In this process, current is generated and flow until an amount of the positive charges induced to the first electrode 123 and an amount of negative charges charged to the contact layer 121 are equal to reach charge equilibrium.

Thereafter, when a portion of the counter part 110 is disposed to overlap any one of the plurality of first electrode layer 123 in a thickness direction (please refer to the right drawing), negative charges of the contact layer 121 are canceled out by positive charges of the counter part 110 to form electrostatic equilibrium, and thus, as the positive charges of the first electrode layer 123 are released, a reverse current is generated.

Here, in the case of the horizontal driving mode, a mechanical movement of the counterpart layer 110 may include both movements in the left-right direction (transverse direction (X)) and the forward/backward direction (longitudinal direction (Y)) on the same horizontal plane. FIG. 3 illustrates the horizontal driving mode in the transverse direction.

Referring to FIG. 4, in the vertical direction in which a mechanical movement is made in a vertical direction, at least a portion of the counterpart layer 110 may vertically move in an upward direction so as to become away from the contact layer 121 or may vertically move in a downward direction so as to be close to the contact layer 121.

When the counterpart layer 110 becomes away from the contact layer (please refer to the left drawing), negative charges of the contact layer 121 are exposed to the outside and positive charges are induced to the first electrode layer 123 to form an electrostatic equilibrium. In this process, current is generated to flow until an amount of the positive charges induced to the first electrode layer 123 and an amount of negative charges electrified to the contact layer 121 are equal to reach charge equilibrium.

Thereafter, when the counterpart layer 110 comes into contact with the contact layer 121 (please refer to the right drawing), negative charges of the contact layer 121 are canceled out by the positive charges of the counterpart layer 110 to form electrostatic equilibrium, and thus, the positive charges of the first electrode layer 123 are released out, generating a reverse current.

Here, in the case of the vertical driving mode, a mechanical movement of the counterpart layer 110 may include a movement in the up-down direction (Z) perpendicular to the same horizontal plane in a vertical direction. FIG. 4 illustrates the vertical driving mode in the up-down direction (Z).

Thus, according to the present disclosure, the plurality of first electrode layers 123 disposed to be spaced apart from each other in the transverse direction (X) and the longitudinal direction (Y) may produce electrical energy, enhance energy harvesting efficiency, and increase an energy harvesting amount, regardless of direction of a mechanical movement, i.e., no matter in which direction (vertical/horizontal, forward/backward/left/right, transverse direction (X), or longitudinal direction (Y)) a mechanical movement is made.

Figure 5:
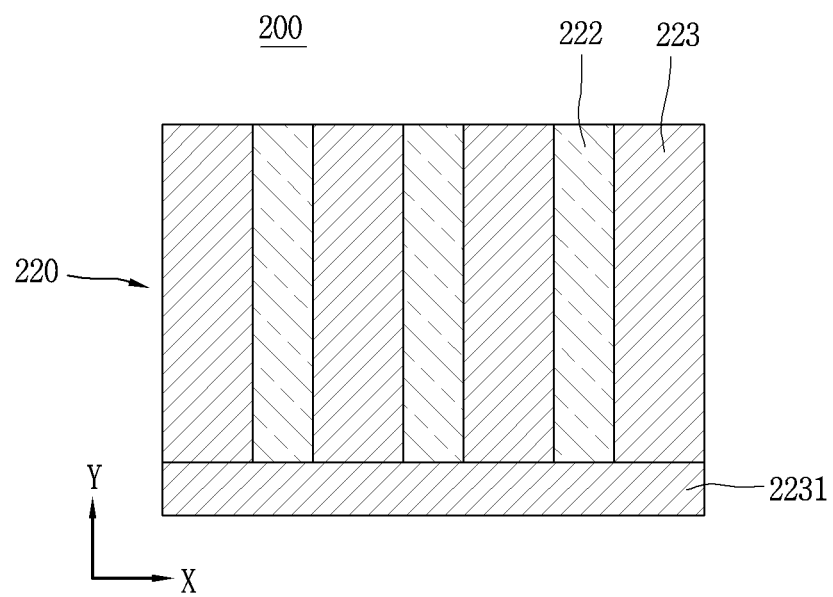
FIG. 5 is a conceptual view illustrating a structure of a nano-generator according to a second embodiment of the present disclosure.

FIG. 5 is a conceptual view illustrating a structure of a nano-generator 200 according to a second embodiment of the present disclosure.

The second embodiment is different from the first embodiment, in that first electrode layers 223 are disposed on a support layer 222 to partially cover the support layer 222, extend in a longitudinal direction, and are partially spaced apart from each other in a transverse direction. Also, a conductive part 2231, extending from one edge portion of an upper portion of the upper layer 222 in a traverse direction, connects one ends of the plurality of first electrode layers.

According to this, electrical energy may be produced according to a mechanical movement in a vertical direction (up-down direction) and a horizontal transverse direction (left-right direction X). Other components are the same as or similar to those of the first embodiment, and thus, a detailed description thereof will be omitted.

Figure 6:
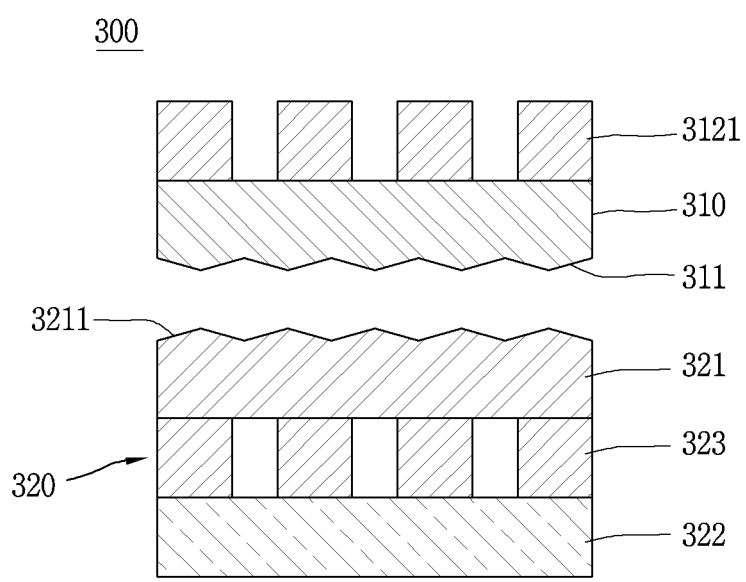
FIG. 6 is a conceptual view illustrating a structure of a nano-generator according to a third embodiment of the present disclosure.

FIG. 6 is a conceptual view illustrating a structure of a nano-generator 300 according to a third embodiment of the present disclosure.

The third embodiment is different from the first embodiment, in that second electrode layers 3121 are disposed on a counterpart layer 310 to partially cover the counterpart layer 310 and are disposed to be spaced apart from each other in a transverse direction. The second electrode layers 312 may overlap first electrode layers 323 in a thickness direction. According to this, when the counterpart layer 310 is electrified with positive charges, negative charges may be induced to the second electrode layers 312, and in this process, current may be generated and flow until an amount of the negative charges induced to the second electrode layer 3121 and an amount of the positive charges electrified in the counterpart layer 310 are equal to reach charge equilibrium. According to this, an area of the first and second electrode layers is further increased, relative to the first and second embodiments, increasing an amount of current flowing in the electrode layer, which results in a further increase in an amount of produced energy, regardless of direction of a mechanical movement.

Figure 7:
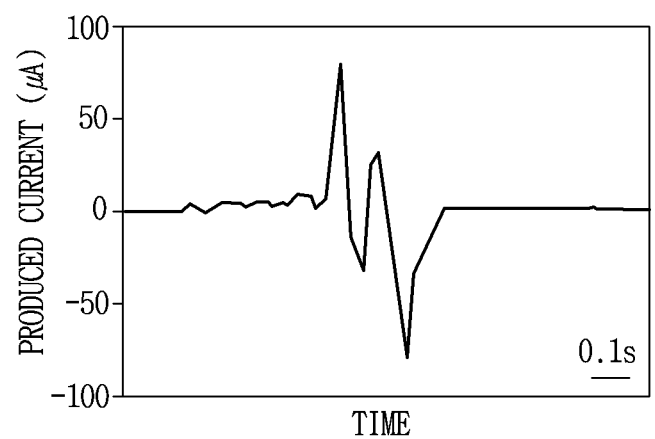
FIG. 7 illustrates graphs of productions of current and voltage in a horizontal driving mode of a multi-mode nano-generator.
Figure 7:
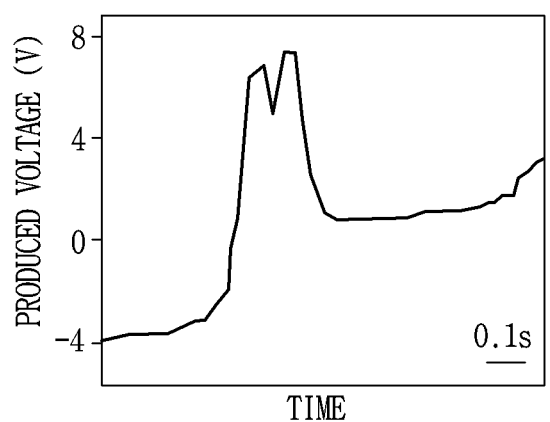

FIG. 7 illustrates graphs of productions of current and voltage in a horizontal driving mode of a multi-mode nano-generator.

Referring to FIG. 7, it is illustrated that a current and a voltage are generated by a multi-mode nano-generator according to the present disclosure. Current ranging from −80 to 80 μA was generated over time. Voltage ranging from 4 to 7V was generated over time.

Figure 8:
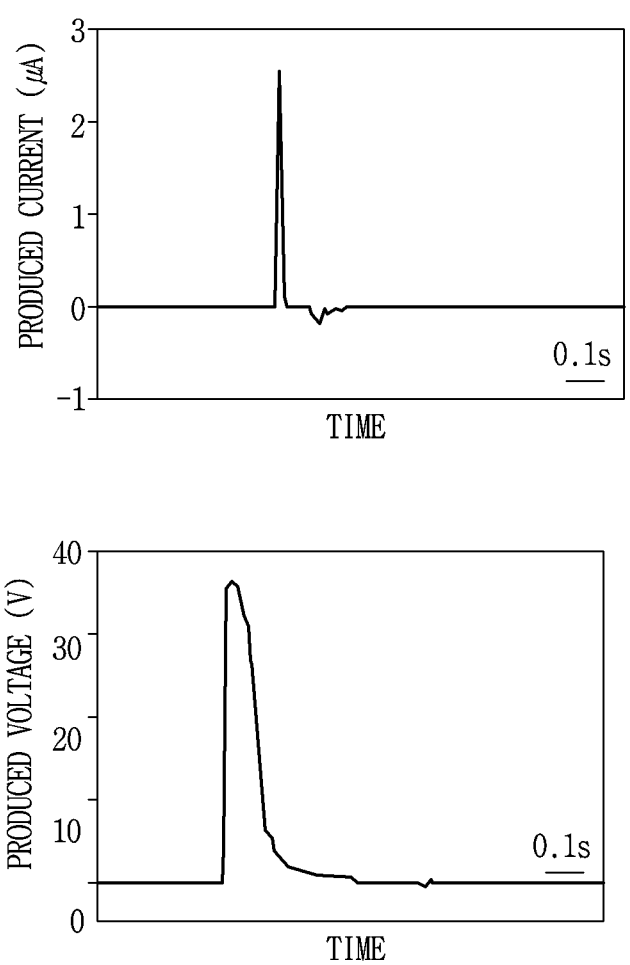
FIG. 8 illustrates graphs of productions of current and voltage in a vertical driving mode of a multi-mode nano-generator.

FIG. 8 illustrates graphs of productions of current and voltage in a vertical driving mode of a multi-mode nano-generator.

Referring to FIG. 8, it is illustrated that current and voltage are generated by a multi-mode nano-generator according to the present disclosure. Current ranging from 0.2 to 2.5 μA was generated over time. Voltage ranging from 0 to 37V was generated over time.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A nano-generator comprising:
a counterpart layer; and
an electricity producing unit producing frictional electricity according to frictional contact with the counterpart layer, wherein the electricity producing unit includes:
a contact layer provided on one surface of the electricity producing unit and coming into contact with the counterpart layer;
a support layer provided on the other surface of the electricity producing unit; and
a plurality of first electrode layers stacked between the contact layer and the support layer and disposed to be spaced apart from each other, wherein the plurality of first electrode layers comprises:
a first set of said plurality of first electrode layers disposed to be spaced apart from each other in a first direction on a horizontal plane;
a first plurality of conductive parts extending in the first direction to electrically connect the two first electrode layers which are located adjacent to each other in the first direction;
a second set of said plurality of first electrode layers disposed to be spaced apart from each other in a second direction perpendicular to the first direction on the horizontal direction;
a second plurality of conductive parts extending in the second direction to electrically connect the two first electrode layers which are located adjacent to each other in the second direction.

2. The nano-generator of claim 1, wherein the plurality of first electrode layers overlaps the support layer in a thickness direction to partially cover upper portions of the support layer.

3. The nano-generator of claim 1, wherein the plurality of first electrode layers have conductive properties.

4. The nano-generator of claim 1, wherein the plurality of first electrode layers are disposed to be spaced apart from each other in a transverse direction and longitudinal direction on the horizontal plane.

5. The nano-generator of claim 1, wherein the plurality of first electrode layers each extending in the first direction are disposed to be spaced apart from each other in the second direction on the horizontal plane.

6. The nano-generator of claim 1, wherein a plurality of fine protrusions in a micro- or nano-scale are provided on an upper surface of the contact layer.

7. The nano-generator of claim 1, wherein a plurality of fine protrusions in a micro- or nano-scale are provided on a lower surface of the counterpart layer.

8. The nano-generator of claim 1, wherein the contact layer and the counterpart layer are formed of materials having different electrostatic characteristics and are different in degree of frictional electrification.

9. The nano-generator of claim 1, wherein the contact layer and the counterpart layer are separated from each other when an external force is not applied to a surface of a portion of at least one of the contact layer and the counterpart layer, and come into contact with each other when an external force is applied thereto.

10. The nano-generator of claim 1, wherein the contact layer and the counterpart layer come into contact with each other when an external force is not applied to a surface of a portion of at least one of the contact layer and the counterpart layer, and are separated from each other when an external force is applied thereto.

11. A nano-generator comprising:
a counterpart layer; and
an electricity producing unit producing frictional electricity according to frictional contact with the counterpart layer,
wherein
the electricity producing unit includes:

a contact layer provided on one surface of the electricity producing unit and coming into contact with the counterpart layer;
a support layer provided on the other surface of the electricity producing unit; and
a plurality of first electrode layers stacked between the contact layer and the support layer and disposed to be spaced apart from each other, and further includes:
a plurality of second electrode layers stacked on the counterpart layer and disposed to be spaced apart from each other,
wherein the plurality of first electrode layers comprises:
a first set of said plurality of first electrode layers disposed to be spaced apart from each other in a first direction on a horizontal plane;
a first plurality of conductive parts extending in the first direction to electrically connect the two first electrode layers which are located adjacent to each other in the first direction;
a second set of said plurality of first electrode layers disposed to be spaced apart from each other in a second direction perpendicular to the first direction on the horizontal direction;
a second plurality of conductive parts extending in the second direction to electrically connect the two first electrode layers which are located adjacent to each other in the second direction.

12. The nano-generator of claim 11, wherein the plurality of first electrode layers and the plurality of second electrode layers overlap in a thickness direction.

13. The nano-generator of claim 11, wherein the plurality of second electrode layers overlap the counterpart layer in a thickness direction to partially cover upper portions of the counterpart layer, and are electrically connected to each other.

14. The nano-generator of claim 11, wherein the plurality of second electrode layers have conductive properties.

* * * * *